(12) United States Patent
Halavy

(10) Patent No.: US 8,228,363 B2
(45) Date of Patent: Jul. 24, 2012

(54) METHOD AND SYSTEM FOR CONDUCTING CONTINUOUS PRESENCE CONFERENCES

(75) Inventor: Avishay Halavy, Tel Aviv (IL)

(73) Assignee: Polycom, Inc., Pleasanton, CA (US)

( * ) Notice: Subject to any disclaimer, the term of this patent is extended or adjusted under 35 U.S.C. 154(b) by 408 days.

(21) Appl. No.: 12/542,450

(22) Filed: Aug. 17, 2009

(65) Prior Publication Data

US 2010/0194847 A1 Aug. 5, 2010

Related U.S. Application Data

(60) Provisional application No. 61/148,772, filed on Jan. 30, 2009.

(51) Int. Cl.
*H04N 7/14* (2006.01)
(52) U.S. Cl. .................................. 348/14.09; 348/14.08
(58) Field of Classification Search ............... 348/14.01, 348/14.02, 14.07–14.15; 370/259, 260; 709/204
See application file for complete search history.

(56) References Cited

U.S. PATENT DOCUMENTS

| | | | |
|---|---|---|---|
| 5,570,363 A | 10/1996 | Holm | |
| 5,821,986 A | 10/1998 | Yuan et al. | |
| 5,983,192 A | 11/1999 | Botzko et al. | |
| 6,141,597 A | 10/2000 | Botzko et al. | |
| 6,182,031 B1 | 1/2001 | Kidder et al. | |
| 6,453,336 B1 | 9/2002 | Beyda et al. | |
| 6,580,754 B1 | 6/2003 | Wan et al. | |
| 6,683,909 B1 | 1/2004 | Falco | |
| 7,006,456 B2 | 2/2006 | Rabipour et al. | |
| 7,133,362 B2 | 11/2006 | Chu et al. | |
| 7,136,394 B2 | 11/2006 | Horowitz et al. | |
| 7,245,710 B1 | 7/2007 | Hughes | |
| 7,593,032 B2 | 9/2009 | Civanlar et al. | |
| 2004/0257433 A1 | 12/2004 | Lia et al. | |

FOREIGN PATENT DOCUMENTS

| | | |
|---|---|---|
| CA | 2319655 | 6/2001 |
| WO | 2005048600 | 5/2005 |

OTHER PUBLICATIONS

Jinzenji, Hiroshi et al. "A Scalable Video Distribution Technique for the Internet"; IEEE Globecom Internet 1996 Conference, London, Nov. 1996.

Radha, Hayder et al "Scalable Video Transcaling for the Wireless Internet"; EURASIP Journal on Applied Signal Processing (2004): 2, pp. 265-279.

Feng, Wei et al. "Layered Self-Identifiable and Scalable Video Codec for Delivery to Heterogeneous Receivers"; Department of Electrical and Computer Engineering, National University of Singapore; http://www.ece.nus.edu.sg/ stfpage/eletck/papers/vcip2003.pdf.

(Continued)

*Primary Examiner* — Tuan Nguyen
(74) *Attorney, Agent, or Firm* — Wong, Cabello, Lutsch, Rutherford & Brucculeri, L.L.P.

(57) ABSTRACT

Disclosed are methods and systems for multipoint videoconferencing. A Media Relay MCU (MRM) receives compressed media (audio, video, and/or data) from a plurality of endpoints participating in a video conferencing session. For a given endpoint, the MRM selects which of other endpoints to display in a CP layout at the given endpoint. The MRM transmits the compressed media from the selected endpoints to the given endpoint to be presented in the CP layout. The MRM does not decode the compressed media.

44 Claims, 7 Drawing Sheets

OTHER PUBLICATIONS

Keller, Ralph et al. "An Active Router Architecture for Multicast Video Distribution"; Computer Engineering and Networks Laboratory, ETH Zurich, Switzerland; Applied Research Laboratory, Washington University, St. Louis MO, USA; This paper appears in INFOCOM 2000. Nineteenth Annual Joint Conference of the IEEE Computer and Communications Societies. Proceedings. IEEE, (2000):3; pp. 1137-1146.

Hu, Qingwen et al. "Image/Video Spatial Scalability in Compressed Domain" IEEE Transactions on Industrial Electronics, vol. 45, No. 1, (1998); pp. 23-31.

Bennett, Roy et al. "Support for Network Technologies in the MECCANO Tools and Performance Characteristics of the MECCANO Systems and Their Effect on System Parameters"; (2000); pp. 1-33; http://www-mice.cs.ucl.ac.uk/multimedia/projects/meccano/deliverables/r5.12/mec-r5.12html.

Zhang, Lixia et al. "RSVP: A New Resource ReSerVation Protocol"; IEEE Network (1993); pp. 8-18.

Wenger, Stephan "Temporal Scalability using P-Pictures for Low-Latency Applications"; IEEE Signal Processing Society 1998 Workshop on Multimedia Signal Processing, Dec. 1998, Los Angeles, CA, USA; http://www.stewe.org/papers/mmsp98/243/index.htm.

European Search Report for EP Application No. 10 000 450.6-1241, dated Nov. 7, 2011, 6 pages.

U. Horn and B. Girod. Scalable video coding for the Internet, in 8th Joint European Networking Conference, Edinburgh, England, May 1997.

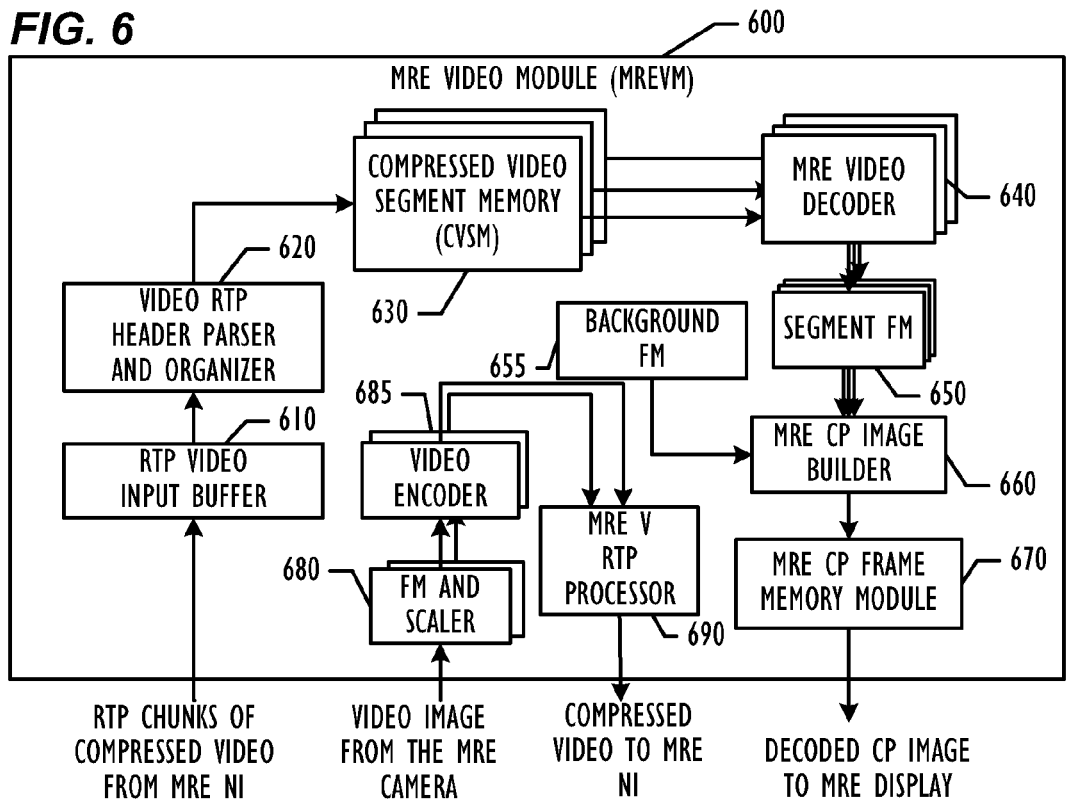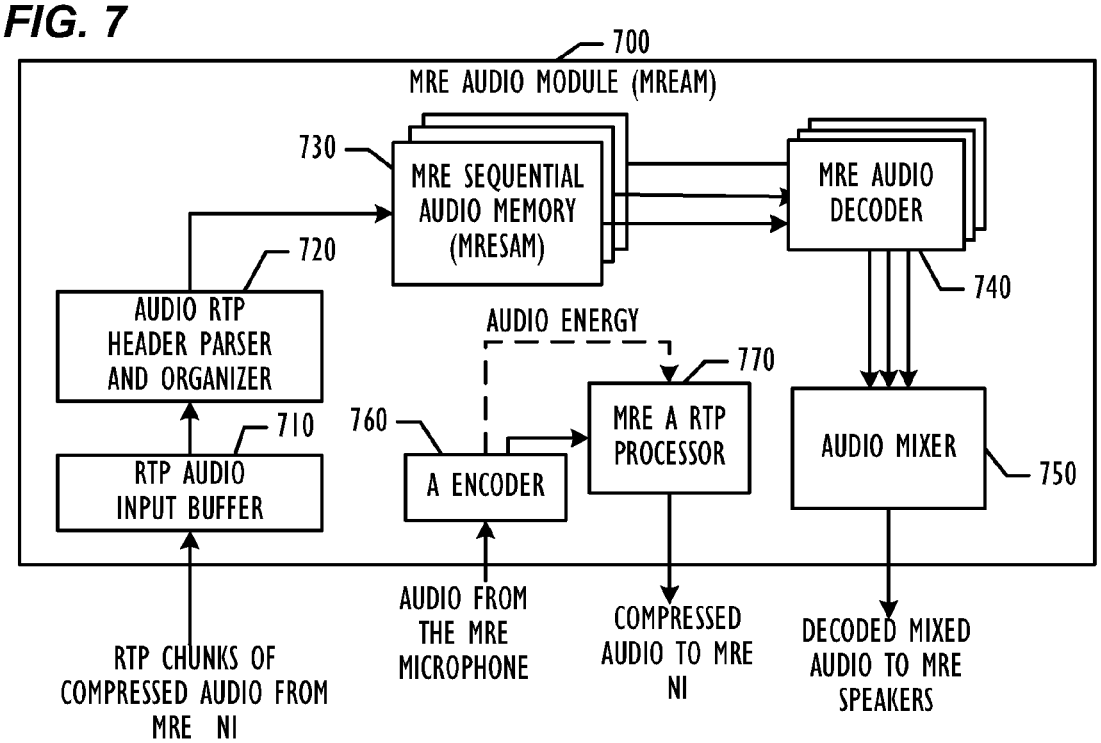

METHOD AND SYSTEM FOR CONDUCTING CONTINUOUS PRESENCE CONFERENCES

CROSS-REFERENCE TO RELATED APPLICATIONS

This application claims the benefit of the filing date of U.S. Provisional Application for Patent entitled METHOD AND SYSTEM FOR CONDUCTING CONTINUOUS PRESENCE CONFERENCES, filed on Jan. 30, 2009 and assigned Ser. No. 61/148,772, the entire contents of which are incorporated herein by reference.

FIELD OF THE INVENTION

The present invention relates to video communication and more particularly to the field of multipoint video conferencing.

BACKGROUND

As traffic over Internet Protocol (IP) networks continues its rapid growth, as well as the growth of the variety of video conferencing equipment to be used over IP networks, more and more people use video conferencing as their communication tool. A common multipoint conference between three or more participants requires a Multipoint Control Unit (MCU). An MCU is a conference controlling entity that is typically located in a node of a network or in a terminal which receives several channels from endpoints. According to certain criteria, the MCU processes audio and visual signals and distributes them to a set of connected channels. Examples of MCUs include the MGC-100, RMX 2000, which are available from Polycom, Inc. A terminal (which may be referred to as an endpoint) is an entity on the network, capable of providing real-time, two-way audio and/or audio visual communication with other terminals or with the MCU. A more thorough definition of an endpoint and an MCU can be found in the International Telecommunication Union ("ITU") standards, such as but not limited to the H.320, H.324, and H.323 standards, which can be found at the ITU website: www.itu.int.

A common MCU may include a plurality of audio and video decoders, encoders, and bridges. The MCU may use a large amount of processing power to handle audio and video communications between a variable number of participants (endpoints). The communication can be based on a variety of communication protocols and compression standards and may be received from different endpoints. The MCU may need to compose a plurality of input audio or video streams into at least one single output stream of audio or video (respectively) that is compatible with the properties of at least one conferee (endpoint) to which the output stream is being sent. The compressed audio streams are decoded and can be analyzed to determine which audio streams will be selected for mixing into the single audio stream of the conference.

A conference may have one or more video output streams where each output stream is associated with a layout. A layout defines the appearance of a conference on a display of one or more conferees that receive the stream. A layout may be divided into one or more segments where each segment may be associated with a video input stream that is sent by a certain conferee (endpoint). Each output stream may be constructed of several input streams, resulting in a continuous presence (CP) conference. In a CP conference, a user at a remote terminal can observe, simultaneously, several other participants in the conference. Each participant may be displayed in a segment of the layout, where each segment may be the same size or a different size. The choice of the participants displayed and associated with the segments of the layout may vary among different conferees that participate in the same session.

A common MCU may need to decode each input video stream into uncompressed video of a full frame; manage the plurality of uncompressed video streams that are associated with the conferences; and compose and\or manage a plurality of output streams in which each output stream may be associated with a conferee or a certain layout. The output stream may be generated by a video output port associated with the MCU. An exemplary video output port may comprise a layout builder and an encoder. The layout builder may collect and scale the different uncompressed video frames from selected conferees into their final size and place them into their segment in the layout. Thereafter, the video of the composed video frame is encoded by the encoder and sent to the appropriate endpoints. Consequently, processing and managing a plurality of videoconferences require heavy and expensive computational resources and therefore an MCU is typically an expensive and rather complex product. Common MCUs are disclosed in several patents and patent applications, for example, U.S. Pat. Nos. 6,300,973, 6,496,216, 5,600,646, or 5,838,664, the contents of which are incorporated herein by reference. These patents disclose the operation of a video unit in an MCU that may be used to generate the video output stream for a CP conference.

The growing trend of using video conferencing raises the need for low cost MCUs that will enable one to conduct a plurality of conferencing sessions having composed CP video images.

There are existing techniques for composing compressed video streams into a CP video image with fewer resources than a common MCU. Some techniques disclose the use of an image processing apparatus for composing a plurality of Quarter Common Intermediate Format (QCIF) coded images into one CIF image. These techniques do not require the decoding of a plurality of coded images when the images are transmitted using the H.261 standard. QCIF is a videoconferencing format that specifies a video frame containing 144 lines and 176 pixels per line, which is one-fourth of the resolution of Common Intermediate Format (CIF). QCIF support is required by some of the International Telecommunications Union (ITU) videoconferencing standards.

Other techniques to overcome the QCIF limitation, of size and layouts, use a sub-encoding method. An exemplary sub-encoding method is disclosed in U.S. Pat. No. 7,139,015, the content of which is incorporated herein by reference.

Therefore, there is a need for a cost efficient method and apparatus to implement a plurality of various layouts with a large number of conferees in a plurality of video conference sessions.

SUMMARY

The disclosure is directed to a Media Relay MCU (MRM) that may receive a compressed media (audio, video, and data) from a plurality of endpoints that participate in a plurality of video conferencing sessions. The compressed media is encoded according to different compression standards such as, but not limited to: ITU compression standard H.264, H.263, G.711, G.729, G.7221.c, G.719, and so on. Henceforth, the description, drawings and claims of the present application may use the term "compressed" as a representative term for "compressed", "encoded", and "compressed and encoded". Per each endpoint, the MRM can determine which audio streams will be heard and which video images will be presented, without the need to decode and encode the media. Consequently the quality of the mixed audio and the composed CP video image is improved by avoiding the encoding and decoding of the media. Also, the ability of the MRM to relay the communicated media to the appropriate destination without the need to decompress and compress will improve the quality of the communication by reducing the latency time. Determining which endpoints will be heard and or presented can be based on an audio energy received from the endpoints, for example. In an alternate embodiment the decision regarding which endpoints will be presented and/or heard can be defined as one of the session's setup parameters, and so on.

An exemplary MRM can process the properties of a conference session, including but not limited to, the number of participants, number of layouts, number of presented conferees in each layout and sizes of the different conferees' images. Based on the properties of a session, an exemplary MRM may negotiate with each of the endpoints in order to establish a connection, and thereafter the MRM may allocate an identification number (ID) to the endpoint, where the ID can be used for identifying the source of a certain received compressed audio packet and/or video packet. In some exemplary embodiments, the ID can be carried in a real-time transport protocol (RTP) header of a RTP chunk of media data, written in the Synchronization Source (SSRC) field or written in the Extension header of the RTP. In another embodiment the ID can be carried in the Contributing Source IDs (CSRC) field in the RTP header. More information on RTP can be found in The Internet Engineering Task Force (IETF) website www.ietf.org.

In an alternate embodiment, an endpoint ID number can be a random number. The ID can be transferred to the MRM, which in turn can verify that each endpoint has a different ID from the other endpoints. Yet in an alternate embodiment, the ID can be replaced by other unique identification, such as but not limited to an IP address and\or an IP port of each stream.

After establishing the connection with an endpoint, the MRM may instruct the endpoints to deliver compressed audio. The compressed audio can comply with a compression standard such as but not limited to G.711, G.729, G.7221.c, and G.719. More information on audio compression standards can be found at the ITU website www.itu.int. Each compressed audio stream can be associated with a different ID number. An exemplary MRM can determine the audio energy of each audio stream and, accordingly, select one or more audio streams to be relayed to the one or more endpoints, where it can be decoded and mixed and sent to the endpoint loudspeakers.

In a similar way, the MRM may instruct the endpoints to deliver a compressed video image in a certain size that matches the segment size in a layout in which the video image will be presented. The size can be defined by the number of pixels in each direction (height and width), for example. The compressed video can comply with a compression standard such as but not limited to H.264. More information on compression standards such as H.264 can be found at the ITU website www.itu.int. Furthermore, the MRM may appoint one of the endpoints as the current speaker endpoint and may request the current speaker endpoint to deliver its video image in a larger image size, which will fit the speaker's segment in the relevant layout. In some exemplary embodiments, endpoints can be adapted to deliver compressed video images in two or more different sizes, wherein each video image size can fit a different segment size (resolution). In such embodiment, a previous speaker endpoint may deliver two sizes of its compressed video image: (i) a regular size to be displayed over a regular conferee's segment layout and (ii) a speaker's size (a larger image) to be presented in the layout segment allocated to the speaker. In such embodiment, a different ID number can be allocated for each compressed video image according to its size (resolution), for example.

A current speaker of a conference session can be the conferee whose audio energy is the highest, for example. The other conferees may be heard and the current speaker's video stream presented in the main segment of the CP layout. In an alternate embodiment, a speaker can be the most active conferee during a given period of time. For example, the most active conferee can be defined as the one whose audio energy was the highest for a certain percentage of the period, such as 60 percent or more, for example.

Based on the properties of the session, each endpoint may be instructed to build an assigned layout. According to the assigned layout, an exemplary endpoint may organize received payload packets of compressed video in two or more Compressed Video Segment Memories (CVSM), wherein each CVSM is associated with a segment in the layout. Each CVSM can be associated with an ID number of an endpoint that delivers a compressed video image that will be presented in a certain segment. Storing received compressed video data in the appropriate CVSMs can be based on the ID number embedded within the RTP header of the packet that carries the received compressed video. The association between a CVSM and the ID number can be dynamically changed according to the activities occurring in the session. For example, the association can be changed by a command from the MRM upon a change in the session, such as but not limited to an endpoint joining or leaving the session, or a change of speaker. An exemplary endpoint can have a cross index table that associates an endpoint ID with a segment in a layout. The table can be updated during the session, reflecting the dynamic component of the session. Organizing the data in a CVSM can be based on the frame number of the packets embedded within the RTP header, for example.

In one exemplary embodiment, the endpoints can be adapted to send an indication of their audio energy by embedding this data in a field in the RTP header or in the Extension header of the RTP. In such embodiment, the MRM may parse the header of the RTP that carries the audio data to determine the audio energy of each endpoint and select the speaker conferee and/or the presented conferees accordingly. In alternate embodiments, the MRM may instruct the endpoints to send an indication on their audio energy over a signaling or control connection or the MRM may decode the received audio streams and determine their energy.

In other exemplary embodiments, in which the audio compression complies with compression standards G.7221.C or G.719 (for example), the audio codec of the endpoints can be configured to add an indication of the audio energy to the audio header. In such embodiment, the MRM can be adapted to search the header of the audio payload and retrieve the field of the audio energy. Yet in other embodiments, the indication of the audio energy can be sent from the endpoints to the MRM via a dedicated out of band status and control connection.

In addition, an exemplary endpoint can be adapted to decode the stored compressed video obtained from each of the CVSMs. The decoded video can be stored in a segment frame memory (FM) module. A segment frame memory stores decoded video data that is to be presented in the CP at the relevant segment. In some embodiments, a scaler can be added between the decoder and its associated segment FM and can be used for adjusting the size of the received image to the associated segment. Yet in other embodiments, the decoded video can be stored in a FM of a CP image in a section that is associated with a segment in the relevant CVSM.

In an alternate exemplary embodiment, a CVSM can be associated with a certain ID for an entire session. In such embodiment the MRM can dynamically associate an ID, which represents a CVSM (a segment in a layout), with compressed video data that will be displayed in the relevant segment. In such embodiment there is no need to inform a receiving endpoint about changes in the layout. The MRM can manage the changes by associating the relevant ID of a segment to the relevant compressed video data that is sent from a conferee that will be presented in the relevant segment. In some embodiments, the ID that represents a segment in a layout can be added to the source ID or the source ID can be replaced by the segment ID.

An exemplary embodiment can be adapted to control multipoint multimedia conferences between Legacy Multimedia Endpoints (LEP) and one or more multimedia endpoints that comply with MRM, with those endpoints being referred to as Media Relay Endpoints (MRE). An MRE can be a terminal of a conferee in the session which has the ability to receive relayed media from an MRM and deliver compressed media according to instructions from an MRM. In order to enable communication with the LEPs, an MRM to legacy adaptor (MRMTLA) can be used by installing it in an intermediate node between an MRM and one or more LEPs. In alternate embodiments, the MRMTLA can be embedded within the MRM. Yet in other embodiments, the MRMTLA can be added to a LEP or to a common MCU that controls the LEP.

In the direction from the MRM to the LEP, an exemplary MRMTLA can handle the plurality of audio streams that were relayed from the MRM, arrange them according to their sources ID, and decode and mix the audio streams. The mixed audio stream can be encoded according to the audio compression standard used by the destination LEP and then sent to the LEP. In a similar manner, the received one or more compressed video streams can be arranged, by the MRMTLA, according to their sources ID, decoded and composed into a CP image. The CP image can be encoded according to the video compression standard used by the destination LEP and sent to the LEP.

In the other direction, from the LEP to the MRM, an exemplary MRMTLA can be adapted to decode the video stream, scale it (if needed) to one or more sizes, and compress each one of the scaled video according to the compression standard used by the MREs that participate in the session. An ID which was assigned to the relevant LEP can be added to the RTP header, for example. The compressed video stream that complies with the need of the MREs is sent toward the MRM. The compressed audio stream that is received from a LEP can be decoded and its energy level can be determined. The decoded audio can be compressed according to the compression standard used by the MREs, an ID that was assigned to the endpoint audio can be added, the indication on the audio energy can be added too and the compressed audio that complies with the requirements of the MRM can be sent toward the MRM.

Control and signaling information received from the MRM, such as the one or more IDs assigned to a LEP, the layout assigned to the LEP, the selected audio streams to be mixed, or the presented streams and their slots, can be processed and used by the MRMTLA. Other signaling and control can be translated and be sent to the LEP, for example to call setup instructions.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present invention will be understood and appreciated more fully from the following detailed description, taken in conjunction with the drawings in which:

FIG. 6 depicts a simplified block diagram with relevant elements of a portion of an MRE Video Module (MREVM) 600, according to an exemplary embodiment.

FIG. 7 depicts a block diagram with relevant elements of a portion of an MRE Audio Module (MREAM) 700, according to an exemplary embodiment.

DETAILED DESCRIPTION

Turning now to the figures in which like numerals represent like elements throughout the several views, exemplary embodiments, aspects and features of the disclosed methods, systems, and apparatuses are described. For convenience, only some elements of the same group may be labeled with numerals. The purpose of the drawings is to describe exemplary embodiments and not for limitation or for production use. Features shown in the figures are chosen for convenience and clarity of presentation only.

Figure 1:
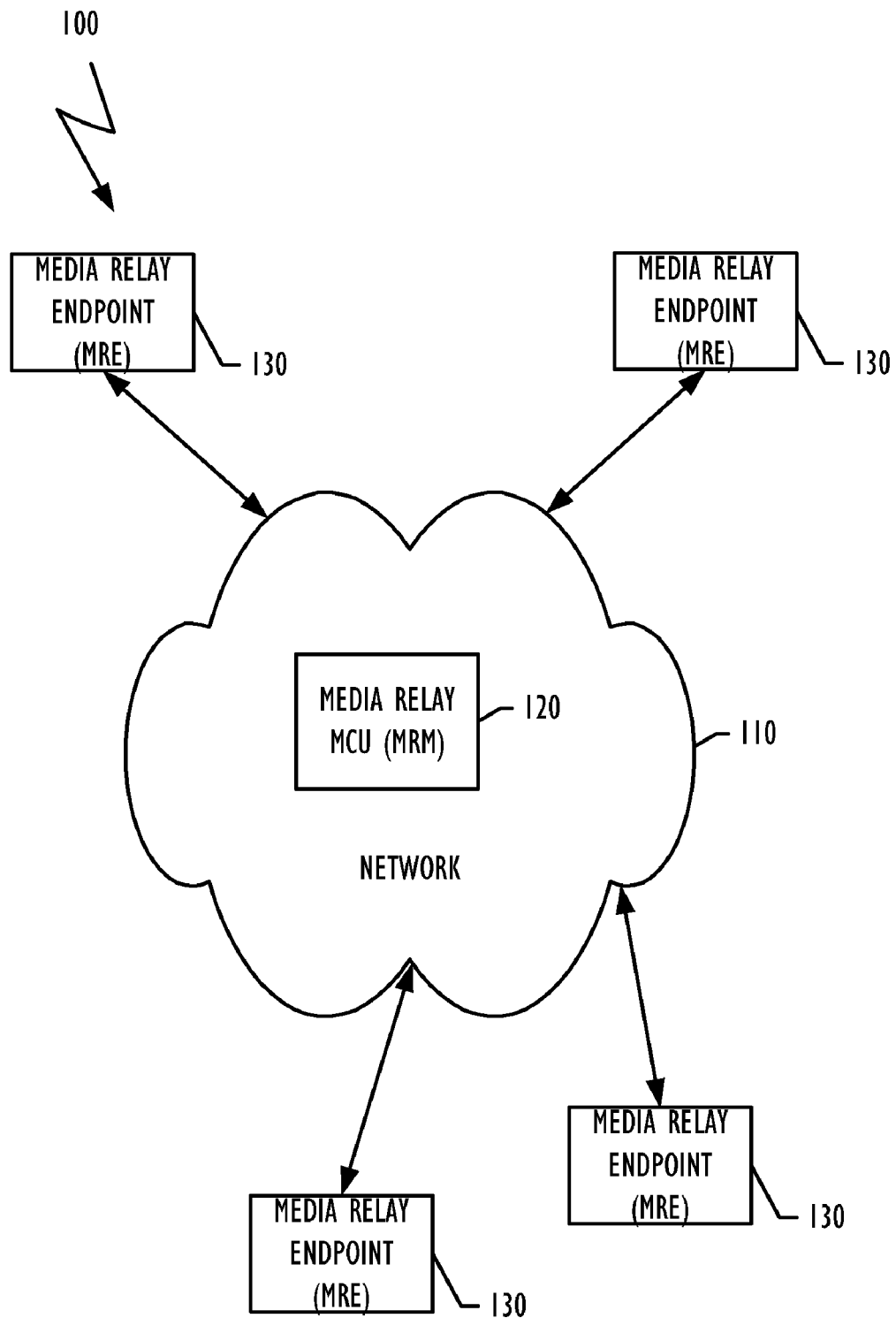
FIG. 1 illustrates a multimedia conferencing system 100 comprising a variety of electronic videoconferencing systems, according to an exemplary embodiment.

FIG. 1 illustrates a novel multimedia conferencing system 100, comprising a variety of novel electronic videoconferencing systems, according to an exemplary embodiment. System 100 can include a network 110, one or more Media Relay MCU (MRM) 120, and a plurality of Media Relay Endpoints (MRE) 130. Network 110 can be, but is not limited to, a packet switched network, a circuit switched network, an IP network, or any combination thereof. The multimedia communication over the network can be based on communication protocols such as but not limited to H.320, H.323, SIP, and may use media compression standards such as but not limited to H.263, H.264, G.711, G.719. In the disclosure the terms data chunks and packets may be used interchangeably.

Each Media Relay Endpoint (MRE) 130 is capable of providing real-time, two-way audio and/or visual communication to another MRE 130 or to the MRM 120. An MRE can be a terminal of a conferee in the session, which has the ability to receive relayed compressed media from an MRM and deliver relay compressed audio and video data chunks according to instructions from the MRM. The relay and relayed compressed media, audio or video, data chunks can be RTP compressed media, audio or video, data chunks respectively. Each MRE 130 can send relay RTP compressed audio data chunks in the appropriate required bit rate or rates and the required compression standard. Similarly, each MRE 130 can send relay RTP compressed video data chunks in the appropriate required size or sizes, bit rate or rates and the required compression standard. In an exemplary embodiment, each MRE 130 can be adapted to send an indication of its audio energy by embedding the audio energy indication in a field in the header or in an Extension header of the relay RTP compressed audio data chunks.

Each MRE 130 can be associated to a certain ID, which can be carried in a real-time transport protocol (RTP) header of a relay RTP compressed chunk of media data. In one embodiment, the ID can be randomly selected by an MRE and potentially confirmed by the MRM after validating its uniqueness. In another embodiment, the ID can be allocated by the MRM 130 and conveyed to the relevant MRE. The MRE may write the ID in the Synchronization Source (SSRC) field in the RTP header of each relay compressed media data chunk. In an alternate embodiment, the ID can be written in the Extension header of each relay RTP compressed media data chunk. The ID can enable the MRM 120 to identify the source of a certain received relay RTP compressed audio and/or video packet. In some exemplary embodiments the relay RTP compressed audio data chunks and the relay RTP compressed video data chunks of the same MRE 130 may have the same ID. In an alternate embodiment, the relay RTP compressed audio data chunks and the relay RTP compressed video data chunks of the same MRE 130 may have different IDs. In some embodiments each segment in a displayed layout can be associated to an ID and the MRM 120 can be responsible to distribute the segments ID numbers to each MRE 130 in the session according to different parameters, such as audio energy, for example. Yet in an alternate embodiment, the IP address and the IP port where the relay RTP compressed audio and/or video data chunks are received on the MRM 120 can be used for identification instead of an ID number.

In one embodiment, according to the received audio energy of each conferee (MRE 130), the MRM 120 can determine which conferees will be presented in a CP image in a certain period of the session. The MREs 130 with the highest audio energy can be selected, presented and heard for a future given period of time, for example. MRM 120 can further determine which of the displayed conferees will be displayed in the speaker segment in the layout. In an alternate embodiment, each MRE 130 can determine which conferees will be presented in the layout and which conferee (MRE 130) will be displayed in the speaker segment. In such embodiments, the MRE 130 user can use a click and view option, which is disclosed in U.S. Patent Publication No. US2003/0,174,202. MRM 120 can also route the appropriate received streams to the appropriate MRE 130.

Exemplary MRE 130 can decode the received relayed RTP compressed video streams of data chunks of the video images received from the selected conferees and display each image in the appropriate layout segment. MRE 130 can decode the received relayed RTP compressed audio streams of audio data chunks, mix the different decoded audio streams and transfer the mixed audio to the MRE 130 loudspeakers. In the other direction, the MRE 130 can deliver relay RTP compressed audio and video data chunks according to the instructions from the MRM 120. More detailed information on the MRE is disclosed below in conjunction with FIGS. 5, 6 & 7.

In an exemplary embodiment, system 100 can further comprise one or more Legacy Multimedia Endpoints (LEP), not shown in the figures. System 100 can be adapted to control multipoint multimedia conferences between legacy multimedia endpoints (LEP) and one or more Media Relay Endpoints (MRE) 130. In order to enable the communication with the LEPs, an MRM to Legacy Adaptor (MRMTLA) can be used (not shown in FIG. 1). An exemplary MRMTLA can be installed in an intermediate node between an MRM 120 and one or more LEPs. In alternate embodiments, the MRMTLA can be embedded within the MRM 120 and yet in another embodiment the MRMTLA can be added to a LEP or to a common MCU that controls the LEPs.

Figure 2:
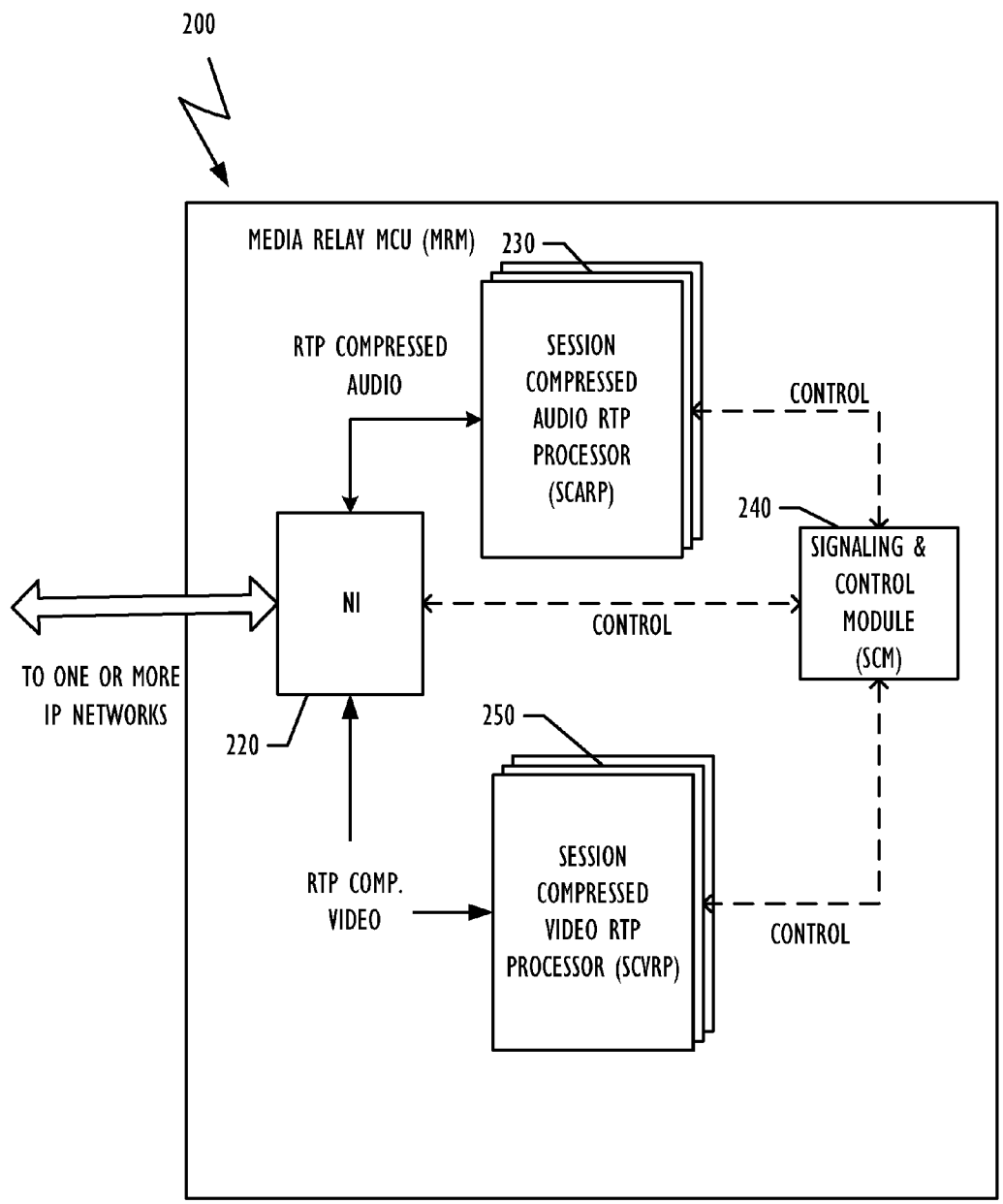
FIG. 2 depicts a block diagram with relevant elements of an exemplary Media Relay MCU (MRM) 200, according to an exemplary embodiment.

FIG. 2 depicts a block diagram with relevant elements of an exemplary Media Relay MCU (MRM) 200, according to an exemplary embodiment. MRM 200 may include a Network Interface module (NI) 220, one or more Session Compressed Audio RTP Processor (SCARP) 230, a Signaling and Control Module (SCM) 240, and one or more session Compressed Video RTP Processor (SCVRP) 250, for example. In an alternate exemplary embodiment MRM 200 may include one or more SCM 240 per each session.

An exemplary network interface module (NI) 220 can communicate with a plurality of video conferencing devices such as MREs 130 (FIG. 1) via network 110 (FIG. 1). Network interface 220 can parse the communication according to one or more communication standards such as but not limited to H.320, H.323 and SIP. Furthermore, the exemplary network interface module 220 (NI) may process the physical layer, data link layer, network layer and the transport layer (UDP\TCP layer) of the received communication, and vice versa. NI 220 can receive and transmit control and data information to/from MRM 200 and MREs 130 (FIG. 1) or other nodes (not shown in the drawings) such as MRMTLA. NI 220 multiplexes/demultiplexes the different signals and streams communicated between the MREs 130 and the MRM 200.

RTP chunks of compressed audio can be transferred via NI 220 to and from the MREs 130 and the SCARPs 230. Each SCARP 230 can be associated to a certain session. NI 220 can determine in which session an MRE 130 is taking part according to the MRE's 130 packets source and/or destination IP port and IP address and/or ID thus enabling the NI 220 to determine to which SCARP 230 to transfer packets received from a certain MRE 130, and vice versa.

RTP compressed chunks of video data are also transferred via NI 220 to and from MREs 130 and SCVRPs 250. Each SCVRP 250 can be associated with a certain video conferencing session. NI 220 can determine in which session an MRE 130 is taking part according to the MRE's 130 packets source and/or destination IP port and IP address and/or source ID thus enabling the NI 220 to determine to which SCVRP 250 to transfer packets received from a certain MRE 130, and vice versa.

NI 220 can also transmit and receive signaling and control data to and from SCM 240 and MREs 130. An alternate embodiment can have more than one signaling and control module (SCM) 240, including one per each session.

Per each conferencing session that MRM 200 is handling, a certain Session Compressed Audio RTP Processor (SCARP) 230 can be allocated to handle the session audio. An exemplary SCARP 230 can receive relay RTP compressed chunks of audio data (header and payloads) via NI 220 from MREs 130 that are taking part in the session. The SCARP 230 can manage a plurality of MRE sequential memories, one for each MRE 130 taking part in the session. The SCARP 230 can parse the RTP header of a received relay RTP compressed audio chunks from an MRE 130 and store it in the appropriate MRE sequential memory. The SCARP 230 can also determine according to a sequence number or a time stamp embedded in the relay RTP header, the appropriate order to store the relay RTP compressed audio chunks in the MRE sequential memory.

SCARP 230 can collect information on the audio energy of each MRE 130 by parsing the appropriate field in the relay RTP header of each received relay RTP compressed audio chunk and then compute a current average audio energy of each MRE 130 in the session by sampling the audio energy levels of received relay RTP compressed audio chunks.

Periodically, each several tens of milliseconds, for example, SCARP 230 can select a group of relay RTP compressed streams of audio chunks to be heard and thus transmitted to the MREs 130. The selection can be based on comparing the audio energy or the average energies associated with the received streams. The number of selected relay RTP compressed streams depends on the audio mixing capabilities of the MREs 130. SCARP 230 can also select which MRE 130 is the main speaker (the one that will be displayed in the largest layout segment, for example) and accordingly forward signaling and control information to the SCM 240. The main speaker can be the one with the highest audio energy for a certain percentage of the heard-streams-selection intervals over a period of time. Yet in an alternate embodiment, SCARP 230 can forward the information on the audio energies of the MREs 130 to SCM 240. The SCM 240 will select the MRE 130 main speaker and group of RTP compressed streams of audio data that will be heard (mixed), and send signaling and control data to the appropriate SCARP 230 and SCVRP 250. In some embodiments, information on the selected group of conferees and/or main speaker is transferred also to the MREs 130. According to signaling and control data sent from SCM 240, SCARP 230 can arrange the relay RTP compressed audio chunks of the selected group and relay them to the appropriate MREs 130 via NI 220 as relayed compressed audio data chunks.

Per each video conferencing session that MRM 200 handles, a Session Compressed Video RTP Processor (SCVRP) 250 is allocated. An exemplary SCVRP 250 can receive streams of relay RTP compressed video chunks (header and payloads) from MREs 130 that are taking part in the session via NI 220. Exemplary SCVRP 250 can manage a plurality of MRE sequential memories, one for each MRE 130 taking part in the session. The SCVRP 250 can parse the header of the received relay RTP compressed video chunks and store it in the appropriate MRE sequential memory according to its frame number or time stamp. From time to time, depending on the frame rate used by the session, according to signals and control information received from SCM 240, SCVRP 250 can access a group of the one or more MRE sequential memories and relay via NI 220 the data of the group of selected MREs toward the appropriate MREs 130.

SCM 240 determines which RTP compressed streams of video data are relayed to MREs 130 and in which layout segment the video images are presented. Based on instructions received from SCM 240, SCVRP 250 relays the appropriate streams to MREs 130 and instructs the MRE in which layout segment to present each of the video images. In one embodiment, SCVRP 250 can notify the MREs 130 of changes in the presentation of conferees by changing the ID in the RTP headers of the relayed RTP compressed video data chunks that it sends. The changed ID in the header can be used as an indication to the receiving MRE 130 as to which segment in the CP image the relayed RTP compressed video data chunks should be displayed. In an alternate embodiment, the SCM 240 can notify the MREs 130 of the changes, via NI 220, by signaling and control data. Yet in another embodiment, the SCVRP 250 can notify the MREs 130 of the changes by changing a predefined field in the RTP headers of the relayed RTP compressed video data chunks that it sends. The predefine field in the RTP header can be used to indicate in which segment the MRE 130 should display the relayed RTP compressed video data chunks.

An exemplary SCM 240 controls the entire operation of the MRM. The SCM 240 can initiate conferencing sessions (reserved or impromptu) and set the connections with the endpoints. Base on the needs of a session, SCM 240 can determine the properties of the session and set the endpoints accordingly. The SCM 240 can also allocate resources to the internal modules of MRM 200 and can allocate ID numbers to each stream of RTP compressed audio/video.

From time to time, SCM 240 can obtain information on the audio energy of each relay RTP compressed audio stream of data chunks and accordingly select a new speaker and the video sources to be presented on each endpoint. Based on these selections, instructions are given to SCARP 230 and SCVRP 250. SCM 240 can also notify the one or more MREs 130 regarding changes in the conference speaker, the number of conferees to be presented and the status of some of the conferees. More information on MRM is disclosed below in conjunction with FIGS. 3, 4 & 8.

Figure 3:
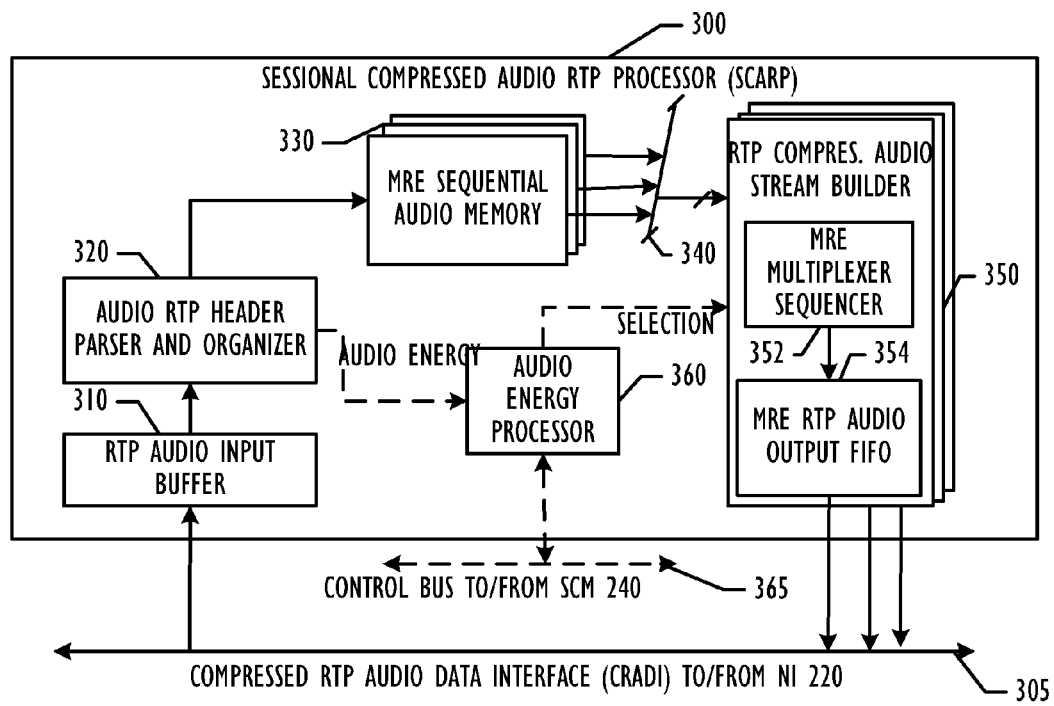
FIG. 3 is a simplified block diagram with relevant elements of a session compressed audio RTP processor 300 that implements exemplary techniques and elements.

FIG. 3 is a simplified block diagram with relevant elements of an exemplary SCARP 300 that implements exemplary techniques and elements of different embodiments. SCARP 300 may include an RTP audio input buffer 310, an audio RTP header parser and organizer 320, a plurality of MRE sequential audio memory 330, a bus 340, a plurality of RTP compressed audio stream builders 350, and an audio energy processor 360. SCARP 300 can be controlled by SCM 240 (FIG. 2) via a control bus 365, which can be an internal bus or a shared memory, for example. SCARP 300 input and output can be connected to NI 220 (FIG. 2) via a compressed RTP audio data interface (CRADI) 305 for receiving and transmitting compressed audio data chunks. CRADI 305 can be an internal bus, or a shared memory.

Each SCARP 300 can be assigned to handle the audio of a CP conference session handled by MRM 200 (FIG. 2). An exemplary SCARP 300 RTP audio input buffer 310 can obtain from the CRADI 305, the relay RTP compressed audio data chunks received from the MREs 130 (FIG. 1) that participate in the session. In an exemplary embodiment, the RTP audio input buffer 310 can determine which relay RTP compressed audio data chunk to collect from CRADI 305 by using the ID number in the relay RTP header. In an alternate embodiment, RTP audio input buffer 310 can receive the relay RTP compressed audio data chunk from NI 220 (FIG. 2) based on the source and/or destination IP address and port number of the received relevant packet.

An exemplary audio RTP header parser and organizer 320 can extract the relay RTP compressed audio data chunks from RTP audio input buffer 310 and parse the header of the relay RTP compressed audio data chunks for retrieving relevant information such as but not limited to: the ID, the sequence number and/or the time stamp of the chunks, and the audio energy, if it exists. In some embodiments, the audio header can be parsed in order to retrieve the audio energy information. Based on the ID, for example, the audio RTP header parser and organizer 320 can transfer the parsed relay RTP compressed audio data chunk to the appropriate MRE sequential audio memory 330 and the audio energy to the audio energy processor 360.

Each MRE sequential audio memory 330 is associated to a certain MRE 130 (FIG. 1). Received relay RTP compressed audio data chunks are stored in the MRE sequential audio memory 330 according to their sequence number and/or time stamp. Each MRE sequential audio memory 330 can be accessed via bus 340, which connects all MRE sequential audio memories 330 with one or more of the RTP compressed audio stream builders 350.

Each RTP compressed audio stream builder 350 can be assigned to one or more MREs 130 (FIG. 1). An exemplary RTP compressed stream builder 350 can comprise an MRE multiplexer and sequencer 352 and an MRE RTP audio output buffer 354. The RTP compressed stream builder 350 can select a group of one or more sources of compressed audio relay data chunks by accessing one or more MRE sequential audio memory 330. The group selection can be based on different parameters such as: control signals received from audio energy processor 360, user specification of a specific source independent of its energy, or the audio mixing capabilities of the destined MRE 130. Usually the group of the selected sources does not include the audio stream received from the assigned MRE. Yet in an alternate embodiment, RTP compressed stream builder 350 can receive control signals from the assigned MRE 130 regarding which MREs 130 to select. Furthermore, from time to time RTP compressed audio stream builder 350 can change its selection of inputs according to real-time changes in the conference.

An exemplary MRE multiplexer sequencer 352 can select one or more input relay RTP compressed audio data chunks streams from bus 340. The selected relay RTP compressed audio data chunks streams can be multiplexed into one relayed RTP compressed audio data chunks stream, which is sent to the MRE RTP audio output FIFO 354 and from there is transmitted towards the appropriate MRE 130 via CRADI 305 and NI 220 (FIG. 2).

An alternate embodiment (not shown in the drawing) of the RTP compressed audio stream builder 350 can include a group of selectors. Each selector is connected to the bus 340 and can select the output of one of the MRE sequential audio memory 330. The other port of the selector can be connected via FIFO to the CRADI 305. In such embodiment, the selected audio streams are sent towards the MREs as a plurality of relayed RTP compressed audio data chunks streams.

In an alternate embodiment, an exemplary RTP compressed audio stream builder 350 can be used to serve a group of conferees that participate in a conference session, wherein all relevant MREs 130 will receive the same stream of relayed RTP compressed audio data chunks.

An exemplary audio energy processor 360 can receive audio energy associated with each relay RTP compressed audio data chunk and based on this information the audio energy processor 360 determines which MRE will be selected to be mixed in the next time period and the selection is transferred to MRE multiplexer sequencer 352 of the appropriate RTP compressed audio stream builder 350. Furthermore, the audio energy processor 360 can determine which endpoint should be presented as the main speaker as described above. This information specifying a new active speaker can be delivered to SCM 240 via the control bus 365.

Figure 4:
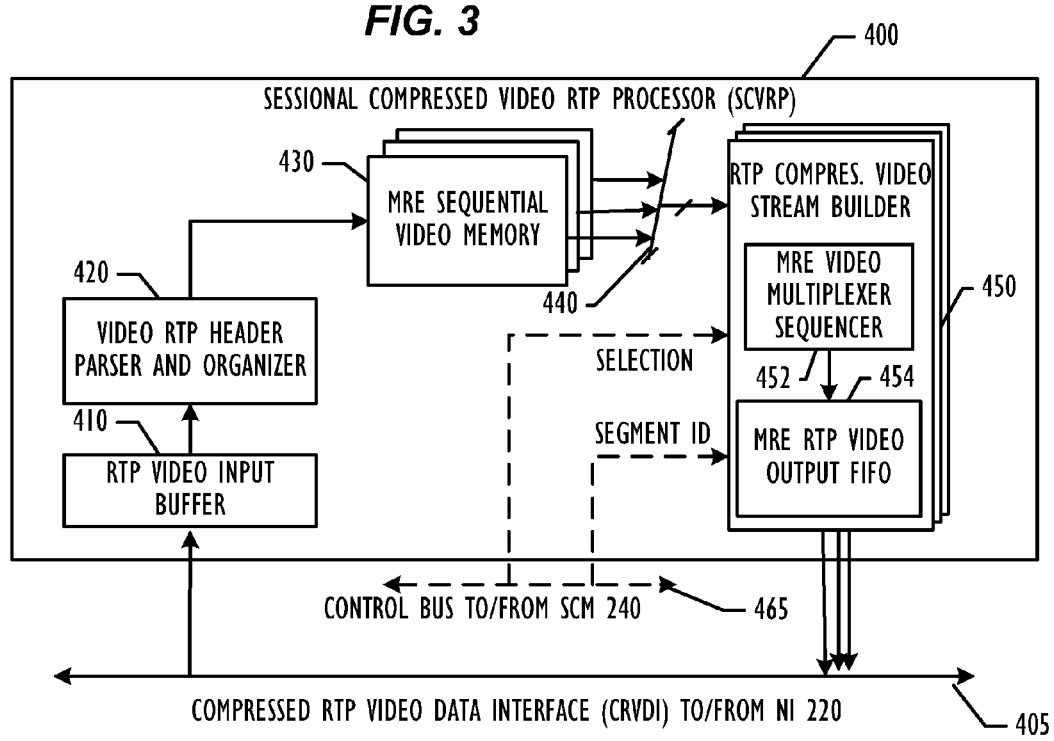
FIG. 4 is a simplified block diagram with relevant elements of a session compressed video RTP processor 400 that implements exemplary techniques and elements.

FIG. 4 is a simplified block diagram with relevant elements of an exemplary Session Compressed Video RTP Processor (SCVRP) 400 that implements exemplary techniques and elements of different embodiments. A SCVRP 400 can comprise: an RTP video input buffer 410, a video RTP header parser and organizer 420, one or more MRE sequential video memory 430, a bus 440, and one or more RTP compressed video stream builders 450. SCVRP 400 can receive control from SCM 240 (FIG. 2) via a control bus 465, which can be an internal bus or a shared memory, for example. Compressed input and output video data chunks can be communicated between SCVRP 400 and NI 220 (FIG. 2) via a compressed RTP video data interface (CRVDI) 405, which may be an internal bus, or a shared memory.

Each SCVRP 400 manages the video of a CP conference session. An exemplary RTP video input buffer 410 can obtain via the CRVDI 405, the relay RTP compressed video data chunks received from the MREs 130 (FIG. 1) that participate in the session. In an exemplary embodiment, the RTP video input buffer 410 can determine which relay RTP compressed video data chunk to handle by the ID number embedded in the RTP header, for example. In an alternate embodiment, the RTP video input buffer 410 receives the video chunks from NI 220 (FIG. 2) based on the source and/or destination IP address and port number associated with the relevant packet.

Video RTP header parser and organizer 420 can extract the relay RTP compressed video data chunks from RTP video input buffer 410 and parse the header of the relay RTP compressed video data chunks for retrieving relevant information such as but not limited to: the ID, the sequence number and/or time stamp and/or frame number with the first macro block address (MBA) associated with each video chunk. According to the retrieved information, the video RTP header parser and organizer 420 can store the relevant relay RTP compressed video data chunk in the appropriate MRE sequential video memory 430.

Each MRE sequential video memory 430 is associated with a certain MRE 130 (FIG. 1) taking part in the session. Each output of the MRE sequential video memory 430 is linked to bus 440, which connects all the MRE sequential video memories 430 with one or more of the RTP compressed video stream builders 450.

Each RTP compressed video stream builder 450 can be assigned to one or more receiving MRE 130 (FIG. 1) for selecting a group of appropriate relay compressed video data streams to be relayed to the MRE. An exemplary RTP compressed video stream builder 450 can comprise an MRE multiplexer sequencer 452 and an MRE RTP video output buffer 454. Each RTP compressed video stream builder 450 can select a group of one or more sources (MREs) of the relay RTP compressed video data chunks. This selection can be based on control signals received from SCM 240 (FIG. 2) via control bus 465 and can be changed as a result of changes in the session. Yet in an alternate embodiment, RTP compressed video stream builder 450 can receive control signals from the assigned MRE 130 itself via SCM 240 and control bus 465, regarding which MREs 130 it would like to see.

An exemplary MRE video multiplexer sequencer 452 can obtain the selected streams of input relay RTP compressed video data chunks from bus 440 and multiplex the group of streams into one stream of relayed RTP compressed video data chunks, which is stored in the MRE RTP video output FIFO 454 and from there is transmitted towards the assigned receiving MRE 130 via CRVDI 405 and NI 220 (FIG. 2). In some conference sessions, one RTP compressed video stream builder 450 can be used for all the MREs 130 of the session, thus all MREs 130 will receive the same stream of relayed RTP compressed video data chunks.

An alternate embodiment (not shown in the drawing) of the RTP compressed video stream builder 450 can comprise a group of selectors. Each selector is connected to the bus 440 and can select the output of one of the MRE sequential video memory 430. The other port of the selector can be connected via FIFO to the CRVDI 405. In such embodiment, the selected video streams are sent towards the MREs as a plurality of relayed RTP compressed video data chunks streams.

In an exemplary embodiment, in which an ID number is assigned to each segment in a layout, the MRE RTP video output FIFO module 454 can be adapted to add the appropriate segment ID to each handled compressed video data chunk. In such embodiment, the association between a segment ID and a relevant ID of the source MRE can be maintained via the control signal received via bus 465. The segment ID can replace the source ID that was associated with the chunk or it can be stored in another field in the RTP header.

Figure 5:
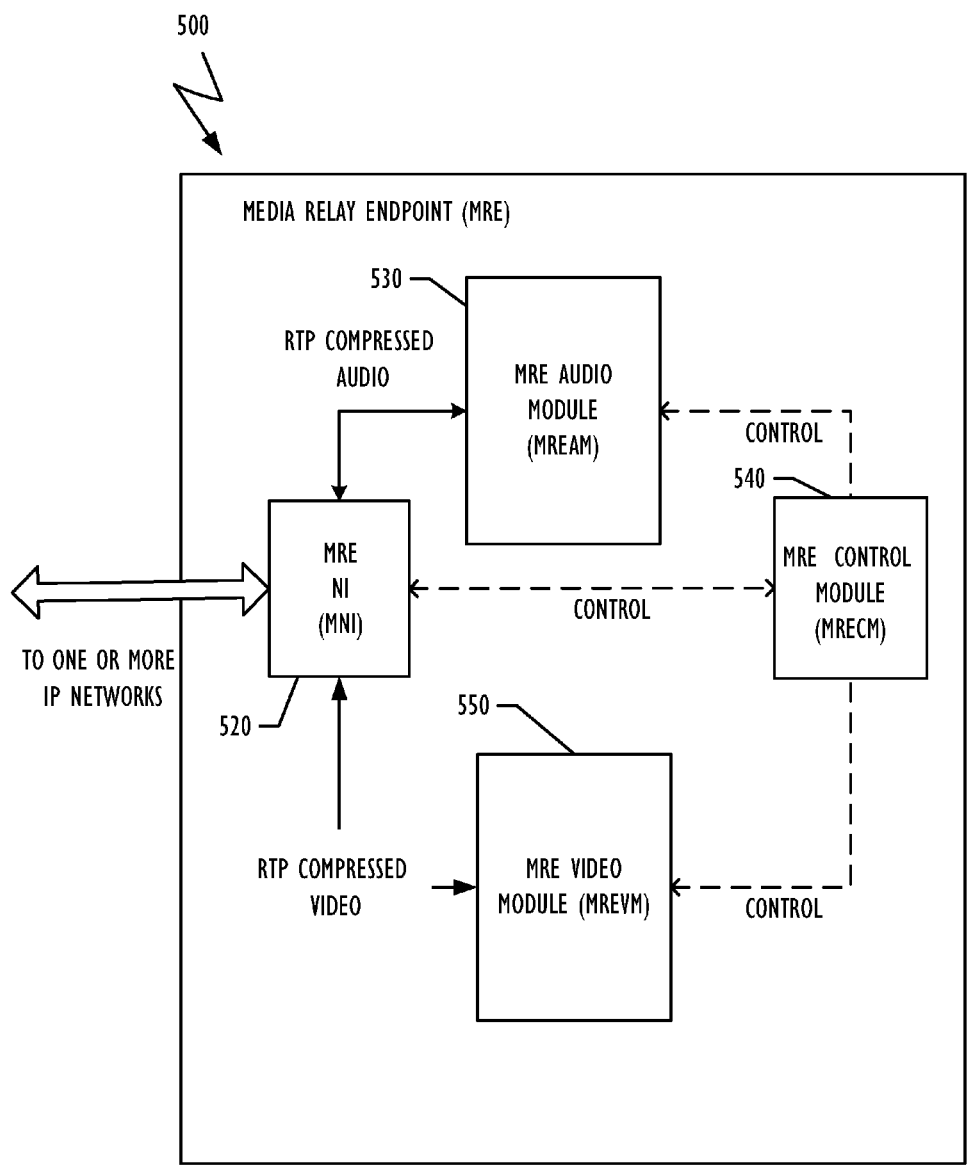
FIG. 5 depicts a simplified block diagram with relevant elements of a Media Relay Endpoint (MRE) 500, according to an exemplary embodiment.

FIG. 5 depicts a simplified block diagram with relevant elements of an exemplary embodiment of a Media Relay Endpoint (MRE) 500. MRE 500 may include an MRE Network Interface module (MNI) 520, an MRE Audio Module (MREAM) 530, an MRE Control Module (MRECM) 540, and an MRE Video Module (MREVM) 550.

An exemplary MRE 500 can communicate via the MRE Network Interface module (MNI) 520 with the Media Relay MCU (MRM) 120 (FIG. 1) or another MRE 130 (FIG. 1) via networks 110 (FIG. 1). An exemplary MNI 520 can process the communication according to one or more communication standards such as but not limited to H.320, H.323, and SIP and compression standards such as H.261, H.263, and H.264. Furthermore, the exemplary network MNI 520 may perform the physical layer, data link layer, network layer and transport layer (UDP\TCP layer) of the communications to and from the MRE.

MNI 520 can multiplex/demultiplex the signal and control as well as media streams communicated between the MRE 500 and MRM 120 (FIG. 1). RTP compressed data chunks of audio and video (header and payloads) are transferred to and from MRM 120 and MREAM 530 and MREVM 550, respectively, via MNI 520. MNI 520 can also transmit and receive signaling and control between MRECM 540 and MRM 120 (FIG. 1).

An exemplary MREAM 530 can receive a group of a plurality of relayed RTP compressed audio data chunks (header and payloads) from MRM 120 (FIG. 1) via MNI 520 and parse the RTP header of the relayed RTP compressed audio data chunks in order to determine parameters such as source ID, time stamp and sequence number. MREAM 530 can also arrange the received relayed RTP compressed audio data chunks according to their ID, time stamp and/or sequence number and then decode, mix, and amplifies the audio data chunks. Next, MREAM 530 can transfer the mixed audio to one or more loudspeakers of the MRE 500.

In the other direction, MREAM 530 can collect audio signals from MRE's 500 microphones and transform the signals from analog to digital, calculate the audio energy, and encode/compress the audio according to the appropriate compression standards into RTP compressed audio data chunks. The compression standard used can be, but not limited to, G.711, G.719 or G.7221.C.

MREAM 530 can embed the calculated audio energy, the ID assigned to the audio stream of the MRE by the MRM, and the time stamp and the sequential number in the appropriate field of the RTP header of the compressed audio data chunks.

In another embodiment, MREAM 530 can send the indication of the audio signal energy via an MRECM 540. More information regarding MREAM 530 is disclosed below in conjunction with FIG. 6.

An exemplary MRE Video Module (MREVM) 550 can receive a group of relayed RTP compressed video data chunks (header and payloads) from MRM 120 (FIG. 1) via MNI 520 and parse the RTP header of received relayed RTP compressed video data chunks in order to determine parameters such as, but not limited to, source ID, segment ID, time stamp and sequence number. MREVM 550 can arrange the received relayed RTP compressed video data chunks according to their time stamp and/or sequence number, decode the relayed RTP compressed video data chunks, and organize them into an appropriate segment FM (frame memories) based on the ID number. For each segment in the layout there can be a segment FM and each segment and/or source ID can be associated to a certain segment FM in the layout. In an alternate embodiment, the source and/or destination IP address and port number can be associated to a segment in the layout. Depending on the frame rate used by MRE 500, the MREVM 520 can combine the different segments FM into a composed FM (CP frame memory) and send the completed CP FM to be displayed over one or more displays of the MRE 500.

In an alternate embodiment, MREVM 550 can arrange the received relayed RTP compressed video data chunks according to their time stamp and/or sequence number, decode the video data chunks, and organize them into one CP FM (continuous presence frame memory) that covers the whole layout. Yet in another exemplary embodiment, MREVM 550 can also receive information from the MRECM 540 regarding changes in the conference main speaker, changes in the number of conferees to be presented, changes of some of the conferees, and so on.

In the other direction, MREVM 550 can collect video images from MRE's 500 camera, scale the video images into the one or more required sizes and encode/compress the video images according to the appropriate compression standards into RTP compressed video data chunks. The compression standard can be, for example: H.264, MPEG 4, or H.263. Information regarding the required size and compression standards can be received from the MRM 120 (FIG. 1) via an MRECM 540. MREVM 550 can embed in the appropriate field in the RTP header different parameters such as, but not limited to, source ID, time stamp, sequential number, frame number and so on. According to the frame rate, the relay RTP compressed video data chunks are transferred to an MRM 120 (FIG. 1) via MNI 520.

An exemplary MRE Control Module (MRECM) 540 can control the operation of the MRE 500. MRECM 540 can establish connections with MRM 120 (FIG. 1) and communicate parameters regarding the number of conferees in the layout that will be displayed over MRE 500, image sizes, compression standards, main speaker, ID information, and so on. ID information can include information on using unique or similar IDs for different, audio or video, types of data chunks sent from the MRE 500.

MRECM 540 can allocate audio and video resources according to the number of selected conferees in the session, the required layout, and the number of required FMs, and so on. MRECM 540 can instruct the MREVM 550 how to construct the layout to be displayed in the MRE 500 one or more displays. MRECM 540 can also update the MREAM 530 regarding the number of conferees to be mixed, and so on. In some embodiment, an out of band connection can be established between MRE 500 and MRM 120 (FIG. 1) that will enable MRE 500 and MRM 120 \dynamically communicate changes in the session.

In some exemplary embodiment of MRE 500, the MRECM 540 and the MREVM 550 may be adapted to add information to the displayed CP image. Exemplary information can indicate the current speaker and/or a conferee's name which is currently presented in each of the segments. In such embodiment, the MRECM 540 can be adapted to receive the information from the MRM. The information can be transferred to the MREVM 550, which includes a text and graphic generator, for converting the status information to be displayed at the endpoint. In the other direction the MREVM 550 and the MRECM 540 can be adapted to display a menu from the endpoint where the menu can be used for controlling the MRM.

FIG. 6 depicts a simplified block diagram with relevant elements of an exemplary embodiment of portion of an MRE Video Module (MREVM) 600. MREVM 600 can have two main sections: (i) an input section, which can handle the received group of relayed RTP compressed video data chunks and (ii) an output section, which can handle the video data captured by an MRE 130 (FIG. 1) camera. An exemplary input section can comprise modules such as an RTP video input buffer 610, a video RTP header parser and organizer 620, one or more Compressed Video Segment Memory (CVSM) 630 (one per each segment in the layout), one or more MRE video decoders 640 (one per each segment in the layout), one or more segment FM 650 (one per each segment in the layout), an MRE CP image builder 660, an MRE CP frame memory module 670, and a background FM 655, for example. The output section can comprise: one or more FM and scaler 680, one or more video encoder 685, and an MRE video RTP processor 690, for example.

An exemplary RTP video input buffer 610, of the input section of the MREVM 600, may obtain relayed RTP compressed video data chunks from MNI 520 (FIG. 5). The Video RTP header parser and organizer 620 can access the input buffer 610 and parse the RTP header for determining different parameters of the received relayed RTP compressed video data. The parameters may include but are not limited to the sequence number, frame number, the source and/or segment ID, time stamp, and so on. RTP header parser and organizer 620 may also have an index table that associates source IDs to segments in the displayed layout, for example. In an embodiment in which the segment ID is not associated with a received data chunk, each Compressed Video Segment Memory (CVSM) 630 can be associated with a certain segment in the displayed layout, for example. Thus, RTP header parser and organizer 620 can transfer an appropriate stream of relayed RTP compressed video data chunks to a certain CVSM 630 according to source ID, for example. RTP header parser and organizer 620 can also organize the RTP compressed video data chunks in the CVSM 630 according to the sequence number or time stamp or frame number and the first MB of received data chunks.

Each CVSM's 630 output can be associated to a certain MRE video decoder 640 and each MRE video decoder 640 output can be associated to a certain segment FM 650. Thus, MRE video decoder 640 can access the appropriate CVSM 630, decode the RTP compressed video data chunks and store the decoded video in the appropriate segment FM 650. In an alternate embodiment, a scaler can be added between a decoder 640 and a segment FM 650. MRE CP image builder 660 can transfer the contents of the different segment FMs 650 into the MRE CP frame memory module 670 to build a CP image. A complete frame of a CP image can be transferred from MRE CP frame memory module 670 to be displayed on the MRE display unit. From time to time, the background FM 655 can be loaded according to different parameters, such as background color, border lines between the different segments and their color and pattern and conferees' names. The background FM 655 can be created at the beginning of a session, but changed at any time during the session. In an embodiment of MRE 500 (FIG. 5), the background can be created by MRECM 540 (FIG. 5). While building the CP image, MRE CP image builder 660 can collect data from the background FM 655 module as it is collected from the segments FMs 650.

The output section of the MREVM 600 receives video images from the MRE 500 camera and stores the images in one or more FM and scaler 680. Each FM and scaler 680 can scale and store the video image into a different size (resolution), for example. The output of each FM and scaler 680 is associated with a video encoder 685, which can encode the data at a different rate and/or quality resulting in compressed video data chunks. The video encoder 685 then transfers the compressed video data chunks to an MRE video RTP processor 690, which can embed a source ID, time stamp, sequence number or other parameters into the headers of the RTP compressed video data chunks. Next, MRE video RTP processor 690 outputs the relay RTP compressed video data chunks to the MNI 520 (FIG. 5).

FIG. 7 depicts a simplified block diagram with relevant elements of an exemplary embodiment of MRE Audio Module (MREAM) 700. MREAM 700 can have two sections: (i) the MREAM input section which can handle the MREAM 700 received group of input relayed RTP compressed audio data chunks, and (ii) the MREAM output section which can handle the audio data that will be output from MRE 130 toward the MRM 120 (FIG. 1), for example. An exemplary MREAM input section can comprise modules such as but not limited to: an RTP audio input buffer 710, an audio RTP header parser and organizer 720, one or more MRE Sequential Audio Memory (MRESAM) 730, one or more MRE audio decoders 740, and an audio mixer 750. The MREAM output section can comprise: an encoder 760 and an MRE audio RTP processor 770, for example.

An exemplary RTP audio input buffer 710 may obtain the group of relayed RTP compressed audio data chunks from MRM 120 via MNI 520 (FIG. 5). The audio RTP header parser and organizer 720 can access input buffer 710, and parse the RTP header for determining parameters such as, but not limited to: sequence number, the source ID, time stamp, and so on. Each MRESAM 730 can be associated to a certain MRE taking part in the session and that has been chosen to be heard, for example. RTP header parser and organizer 720 can transfer an appropriate stream of relayed RTP compressed audio data chunks to a certain MRESAM 730 according to the data chunks ID, for example. In an alternate embodiment, RTP header parser and organizer 720 can transfer an appropriate stream of relayed RTP compressed audio data chunks to a certain MRESAM 730 according to the source IP address and port, for example. RTP header parser and organizer 720 can also organize the RTP compressed audio data chunks in each of the MRESAM 730 according to the sequence number or time stamp of the data chunks. Each MRESAM 730 output is associated to an MRE audio decoder 740, which accesses the MRESAM 730 and decodes the RTP compressed audio data chunks. The audio mixer 750 can receive the outputs of all MRE audio decoders 740, mix them and output the mixed audio to the MRE 500 loudspeakers.

An exemplary output section of the MREAM 700 can receive audio from the MRE's 500 microphones. The encoder 760 can collect the received input audio, determine its energy and encode the input audio into compressed audio data chunks. The compression can be based on compression standards such as but not limited to G.719, G.7221.C, etc. Next, the compressed audio data chunks are transferred to the MRE audio RTP processor 770. Also the indication on the audio energy can be transferred to the MRE audio RTP processor 770, which can embed different parameters in the headers of the RTP audio data chunk. The parameters can include sequence number, source ID, time stamp, audio energy indication, and so on. Next, MRE audio RTP processor 770 outputs the relay RTP compressed audio data chunks to MNI 520 (FIG. 5) and from there to the MRM 120. In an alternate embodiment, the audio energy indication can be stored in the header of the compressed audio data chunk.

Figure 8:
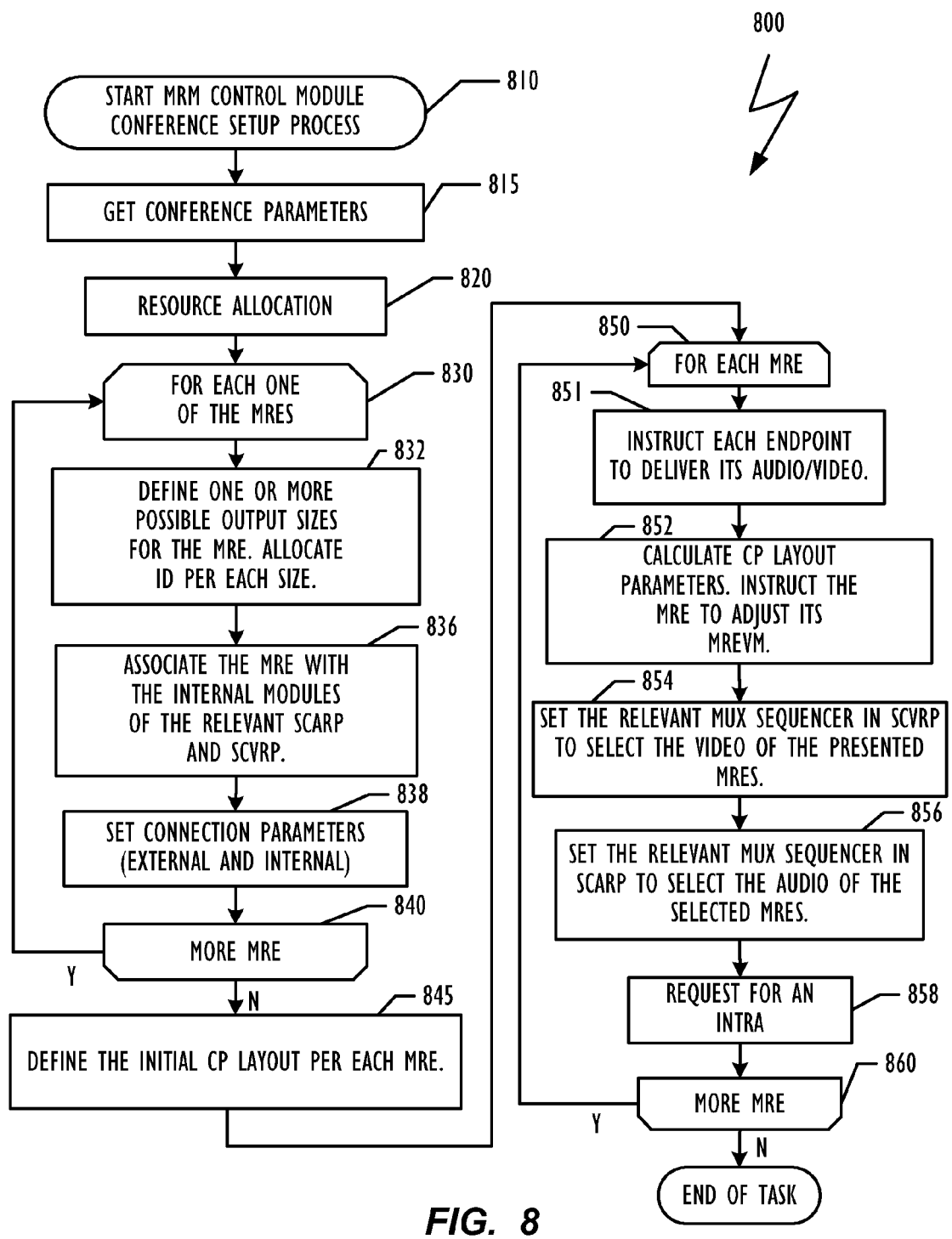
FIG. 8 is a flowchart illustrating relevant steps of a conference setup method 800 implemented by an exemplary embodiment.

FIG. 8 is a flowchart illustrating relevant processes of a conference setup method 800 implemented by an exemplary embodiment of an MRM control and signaling module (SCM) 240 (FIG. 2). Method 800 can be initiated by the MRM Control Module Conference setup process in step 810. At step 815 conference parameters such as the number of conferees (MREs 130), bit rate, the compression standards, CP layout and so on are collected. Next, method 800 involves the allocation of different conference resources such as NI 220 (FIG. 2) resources, an associated SCARP 230, an associated SCVRP 250, bandwidth, and so on at 820. Then a loop between steps 830 to 840 is executed for each MRE 130 (FIG. 1) taking part in the conference. At step 832 one or more possible image size for the MRE 130 and its associated ID is defined. In an alternate embodiment, method 800 can use the IP address and port of each MRE 130 instead of an ID, for example. Step 836 involves associating the MRE 130 with the internal modules of MRM 200 (FIG. 2) such as the SCARP 230 (FIG. 2) and SCVRP 250 (FIG. 2), for example.

At step 836, the MRE's ID is linked to one of the MRE sequential audio memory 330 (FIG. 3), one of the RTP compressed stream builders 350 (FIG. 3), one of the MRE sequential video memory 430 (FIG. 4) and to one of the RTP compressed stream builders 450 (FIG. 4), and so on. Next, different connection parameters (external and internal) for the resources, which are associated with the relevant MRE 130, are set at 838. Exemplary external connection parameters can be: an ID for the MRE, remote IP address and port, local IP address and port. Exemplary internal connection parameters can be: the internal connections of the modules in the MRM 200 (FIG. 2) itself such as internal connections of the modules inside the SCARP 300 (FIG. 3) and the SCVRP 400 (FIG. 4), and so on.

Next a decision is made as to whether there are more MREs 130 to be set at step 840. If yes, then method 800 returns to step 830 to manage the setup of the next MRE 130. If no, then method 800 proceeds to step 845 which involves the definition of the initial CP layout for each MRE 130 in the conference. Method 800 proceeds to step 850 in which another loop begins for each MRE 130 in the conference. At step 851 method 800 can load the relevant MRE 130 with the image size that the MRE needs to send, the one or more IDs that the MRE will need to add in the audio and video RTP headers, and so on. Parameters of the CP layout that are assigned to the MRE can be calculated and loaded to the MREVM 600 (FIG. 6) at step 852. Exemplary parameters can be: the number of segments in the layout, the ID or IP address and port that is associated with each segment, the MREs that will be presented, the current speaker, and so on. At step 852, the MRE's MREVM 600 (FIG. 6) can also be instructed to define the parameters of segment frame memories 650 (FIG. 6) and CP frame memories 670 (FIG. 6). The internal modules of MREAM 700 (FIG. 7), such as the audio RTP header parser and organizer module 720 and the audio mixer 750 (FIG. 7), for example, can be set in a similar way.

Next, method 800 sets the relevant parameters in the internal modules of the MRM. Internal modules such as, but not limited to, the SCARP 300 (FIG. 3) and SCVRP 400 (FIG. 4). At step 854, different parameters and connections of the internal modules of SCVRP 400 (FIG. 4) are set. Exemplary parameters and connections can include the association of MRE sequential video memory 430 (FIG. 4) with an ID and/or an IP address and port of the MRE, the setting of the relevant MRE video multiplexer sequencer 452 (FIG. 4) to select the video of that MRE. At step 856, different parameters and connections of the internal modules of SCARP 300 (FIG. 3) are set. Exemplary parameters and connections can include association of MRE sequential audio memory with an ID and/or an IP address and port of the MRE, setting the relevant MRE multiplexer sequencer 352 (FIG. 3) to select the audio of that MRE.

At step 858 the MRM requests an Intra frame from the relevant MRE and proceeds to step 860. At step 860, a decision is made whether more MREs need setting. If yes, then method 800 returns to step 850. If no, then method 800 ends. A method similar to method 800 can be executed each time a main speaker changes or a new conferee is added or removed from the session, and so on.

Figure 9:
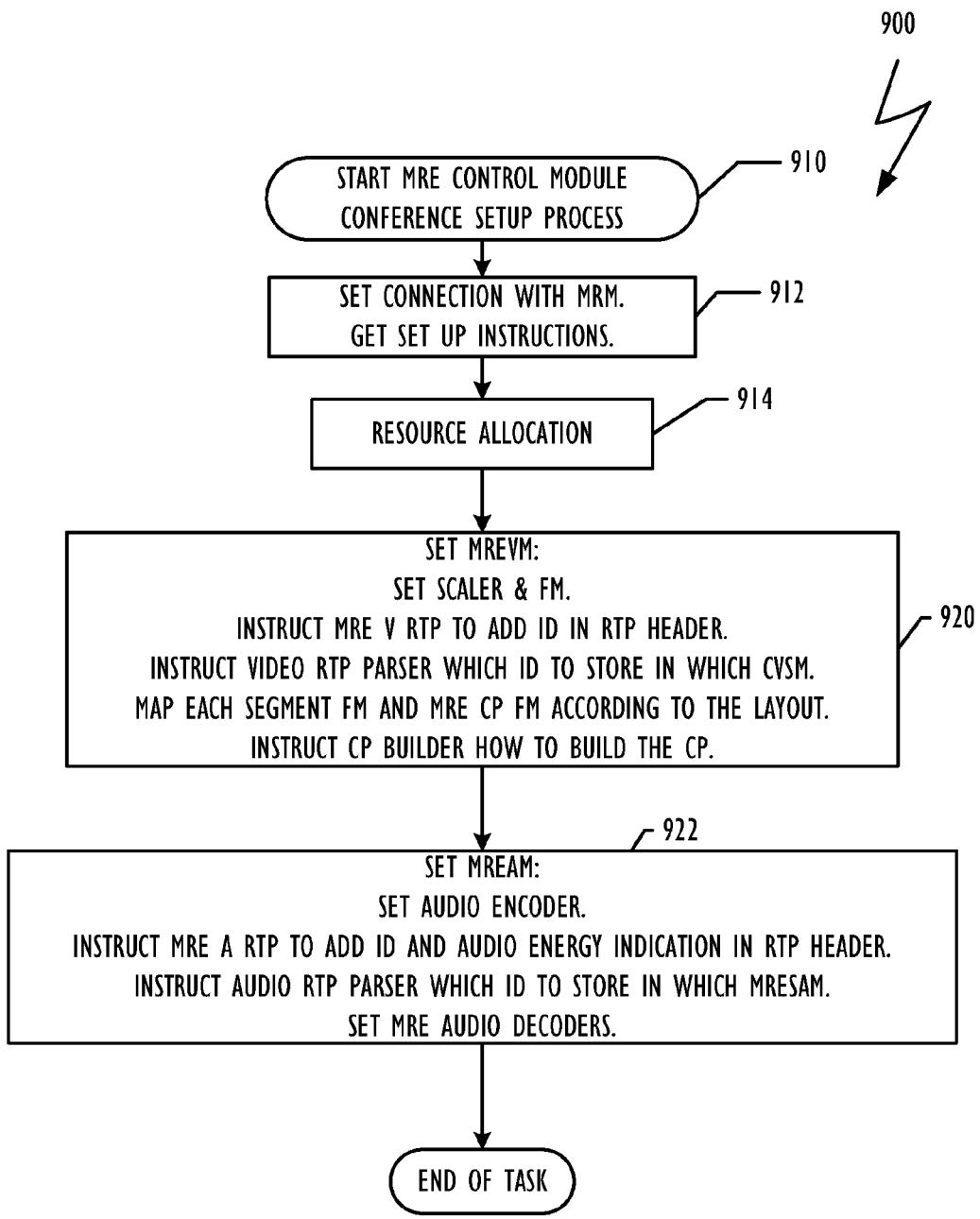
FIG. 9 is a flowchart illustrating relevant steps of an MRE control module conference setup method\task 900, implemented by an exemplary embodiment.

FIG. 9 is a flowchart illustrating relevant steps of an MRE conference setup method 900 implemented by an exemplary embodiment of an MRE control module (MRECM) 540 (FIG. 5). Method 900 can be initiated at step 910. At step 912, a connection with MRM 120 (FIG. 1) is established and the MRE control module 540 can receive 912 setup instructions. Exemplary set up instructions can be: one or more IDs that will be associated with the media streams received from this MRE, the sizes of the images the MRE will need to transmit, the number of conferees to be heard and displayed and the layout information. Method 900 can then allocate 914 resources accordingly. Resources such as, but not limited to: resources in MNI 520 (FIG. 5), MREVM 550 (FIG. 5), MREAM 530 (FIG. 5), bandwidth, and so on.

Next, method 900 proceeds to step 920 where different internal modules of MREVM 600 (FIG. 6) are set. Exemplary settings can be: instructing the Video RTP header parser and organizer 620 (FIG. 6) based on IDs received at step 912; establish which relayed compressed video RTP data chunks to store in which CVSM 630 (FIG. 6); setting parameters of each segment FM 650 (FIG. 6) and MRE CP FM module 670 according to the layout of the session; instructing 920 the CP builder 660 how to build the CP; updating 920 the background FM 655; setting the FM and scaler 680 (FIG. 6); instructing the MRE video RTP 690 to add the ID in the RTP header, and so on. In some exemplary embodiment of MRE 500, in which the MRECM 540 and the MREVM 550 (FIG. 5) are adapted to add information to the displayed CP image, step 920 can be adapted to deliver this information. The information can indicate the current speaker, conferee's name which is currently presented in each of the segments, etc. In such embodiment, the CP builder 660 can be adapted to convert the information into video data and add it to the CP image to be displayed over the endpoint.

Next, at step 922 different internal modules of MRAVM 700 (FIG. 7) are set. Settings can include: setting the audio encoder 760 (FIG. 7) according to the compressed standard; instructing the MRE audio RTP to add the ID and audio energy indication in the RTP headers; instructing the audio RTP parser 720 which ID to store in which MRESAM 730 (FIG. 7); setting the MRE audio decoder 740, and so on. After step 922, the method is complete and the relevant MRE is ready to send an Intra frame. A method similar to method 900 can be executed each time a main speaker changes or a new conferee is added or removed, and so on.

In the description and claims of the present disclosure, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The various embodiments have been described using detailed descriptions that are provided by way of example and are not intended to limit the scope of the invention. The described embodiments comprise different features, not all of which are required in all embodiments. Some embodiments utilize only some of the features or possible combinations of the features. Many other ramification and variations are possible within the teaching of the embodiments comprising different combinations of features noted in the described embodiments.

It will be appreciated by persons skilled in the art that the various embodiments are not limited by what has been particularly shown and described herein above. Rather the scope of the embodiments are defined by the claims that follow.

I claim:

1. A method of providing a continuous presence layout at a first endpoint in a multipoint video conference between the first endpoint and a plurality of endpoints, comprising:
   defining a continuous presence layout for the first endpoint, the continuous presence layout comprising a plurality of segments, each segment for displaying video from one of the plurality of endpoints;
   associating each segment of the continuous presence layout with a selected endpoint of the plurality of endpoints;
   receiving relay compressed video data chunks from the plurality of endpoints at a media relay multipoint controller;
   parsing the received relay compressed video data chunks;
   organizing the parsed relay compressed video data chunks from the selected two or more endpoints into a group of two or more streams of relayed compressed video data chunks;
   transferring the group of two or more streams toward the first endpoint; and
   changing the continuous presence layout during the conference based on audio energy sent from the plurality of endpoints.

2. The method of claim 1, further comprising instructing the first endpoint to build the defined continuous presence layout such that video from the selected two or more endpoints is presented in a segment of the continuous presence layout associated with that endpoint.

3. The method of claim 1, further comprising instructing each of the plurality of endpoints to send relay compressed video data to the media relay multipoint controller in a format matching the size of the segment of the continuous presence layout associated with that endpoint.

4. The method of claim 1, wherein each chunk of the relay compressed video data chunks from the plurality of endpoints comprises a header comprising an identification indicator associated with the endpoint generating the chunk.

5. The method of claim 4, wherein associating each segment of the continuous presence layout with a selected endpoint comprises associating each segment with the identification indicator associated with the selected endpoint.

6. The method of claim 3, wherein each relayed compressed video data chunk is associated with an ID indication of a segment in the continuous presence layout in which it will be presented.

7. The method of claim 4, wherein the identification is derived from an IP address and IP port of the endpoint generating the chunk.

8. The method of claim 3, wherein the data chunks are real-time transport protocol (RTP) data chunks.

9. The method of claim 1, wherein the receiving relay compressed video data chunks from at least one endpoint of the plurality of endpoints comprises receiving relay compressed video data chunks of at least two video images in different sizes.

10. The method of claim 9, wherein the compressed video data chunks of a video image in a first size is transferred toward the first endpoint and the compressed video data chunks of a video image in a second size is transferred toward another endpoint.

11. The method of claim 1, further comprising instructing at least one endpoint of the plurality of endpoints to deliver compressed video data formatted in two or more different sizes.

12. The method of claim 11, wherein each of the two or more sizes corresponds to different segments of a continuous presence layout and each size is presented over a different endpoint.

13. The method of claim 1, wherein each stream of relayed compressed video data chunks comprises the compressed video data chunks received from one endpoint from the selected two or more endpoints.

14. The method of claim 1, further comprising:
   receiving relay compressed audio data chunks from the plurality of endpoints;
   selecting a second group of two or more endpoints to be heard by the first endpoint;
   parsing the received relay compressed audio data chunks;
   organizing the parsed relay compressed audio data chunks received from the second group of endpoints into a second group of two or more streams of relayed compressed audio data chunks; and
   transferring the second group of stream toward the first endpoint.

15. The method of claim 14, wherein the relay compressed audio data chunks comprise an audio energy indicator.

16. The method of claim 15, further comprising changing the continuous presence layout during the conference based on the audio energy indicator.

17. The method of claim 16, further comprising determining a current speaker endpoint based on the audio energy.

18. The method of claim 14, further comprising:
   receiving at the first endpoint the transferred second group of streams of relayed compressed audio data chunks;
   decoding the received relayed compressed audio data chunks into a group of decoded audio streams; and
   mixing the group of the decoded audio streams.

19. A media relay multipoint controller for providing a continuous presence layout at a first endpoint during a multipoint video conference between the first endpoint and a plurality of endpoints, the continuous presence layout comprising a plurality of segments, each segment displaying video from a selected endpoint of the plurality of endpoints, the media relay multipoint controller comprising:
- a network interface that receives relay compressed video data chunks from the plurality of endpoints and sends relayed compressed video data chunks to the first endpoint;
- a signaling and control module that selects two or more endpoints from the plurality of endpoints; and
- a compressed video processor that parses the received relay compressed video data chunks, organizes the parsed relay compressed video data chunks received from the selected two or more endpoints into a group of two or more streams of relayed compressed video data chunks and transfers the group toward the first endpoint via the network interface,
- wherein the signaling and control module selects the two or more selected endpoints based at least in part on audio energy sent from the plurality of endpoints.

20. The controller of claim 19, wherein each compressed video data chunk comprises a header and a video payload wherein the header comprising an identification indicator associated with the endpoint generating the chunk.

21. The controller of claim 19, wherein the signaling and control module further determines the segment in which to display video from each of the selected endpoints.

22. The controller of claim 19, wherein the group of two or more streams of relayed compressed video data chunks is transferred toward the first endpoint in a multiplexed stream of relayed compressed video data chunks.

23. The controller of claim 19, wherein the received relay compressed video data chunks from each endpoint comprises compressed video data chunks of two video images in different sizes.

24. The controller of claim 23, wherein the compressed video data chunks of a video image in a first size is transferred toward the first endpoint and the compressed video data chunks of a video image in a second size is transferred toward another endpoint.

25. The controller of claim 19, wherein each stream of relayed compressed video data chunks comprises the compressed video data chunks received from one endpoint from the selected two or more endpoints.

26. The controller of claim 20, wherein the compressed video processors identifies video data from the selected endpoints based on the identification indicator.

27. The controller of claim 20, wherein the data chunks are real-time protocol (RTP) data chunks.

28. The controller of claim 20, wherein the payload of the relayed compressed video data chunks remains as the payload of the relay compressed video data chunks from which it was organized.

29. The controller of claim 19, wherein the network interface also receives relay compressed audio data chunks from the plurality of endpoints, and wherein the signaling and control module further selects a second group of two or more endpoints to be heard by the first endpoint and wherein the controller further comprises a compressed audio processor that parses the received relay compressed audio data chunks, organizes the parsed relay compressed audio data chunks received from the second group of endpoints into a second group of two or more streams of relayed compressed audio data chunks and transfers the second group of streams toward the first endpoint via the network interface.

30. The controller of claim 29, wherein the compressed audio processor determines an audio energy associated with the received relay compressed audio data chunks from each of the plurality of endpoints.

31. The controller of claim 30, wherein the signaling and control module selects the two or more selected endpoints based at least in part on the audio energy.

32. The controller of claim 30, wherein the signaling and control module determines a current speaker endpoint based on the audio energy.

33. The controller of claim 30, wherein the two or more selected endpoints are changed during the conference based at least in part on the audio energy.

34. The controller of claim 19, wherein the second group of two or more streams of relayed compressed audio data chunks is transferred toward the first endpoint in a multiplexed stream of relayed compressed audio data chunks.

35. A system for providing a continuous presence layout at a first endpoint during a multipoint video conference between the first endpoint and a plurality of endpoints, the continuous presence layout comprising a plurality of segments, each segment displaying video from a selected endpoint of the plurality of endpoints, the system comprising:
- a media relay multipoint control unit communicatively connected to the plurality of endpoints through a network, the media relay multipoint control unit comprising:
  - a network interface that receives relay compressed video data chunks from the plurality of endpoints and sends relayed compressed video data chunks to the first endpoint;
  - a signaling and control module that selects two or more endpoints; and
  - a compressed video processor that parses the received relay compressed video data chunks, organizes the parsed relay compressed video data chunks received from the selected two or more endpoints into a group of two or more streams of relayed compressed video data chunks and transfers the group toward the first endpoint via the network interface; and
- the first endpoint comprising:
  - an endpoint video processor that:
    - receives the group of streams of relayed compressed video data chunks;
    - organizes the received relayed compressed video data chunks into a plurality of groups, each group corresponding to one of the selected endpoints;
    - decodes each group of organized video data; and
    - assembles the continuous presence layout from the decoded video data,
- wherein the two or more selected endpoints are selected based at least in part on audio energy sent from the plurality of endpoints.

36. The system of claim 35, wherein each relay compressed video data chunk comprises a header comprising an identification indicator associated with the endpoint generating the chunk.

37. The system of claim 35, wherein one or more of the plurality of endpoints comprises:
- a video processor that:
  - encodes video images into compressed video data chunks;

organizes the compressed video data chunks into relay compressed video data chunks by associating an identification indicator in a header of the compressed video data chunk; and transmits a stream of the relay compressed video data chunks toward the media relay multipoint control unit.

38. The system of claim 37, wherein the video processor identifies relay compressed video data chunks from the selected endpoints based on the identification indicator.

39. The system of claim 37, wherein one or more of the plurality of endpoints comprises a scaler that scales the video images to a size corresponding to a segment of the continuous presence layout in response to a request from the media relay multipoint control unit.

40. The system of claim 39, wherein one or more of the plurality of endpoints further comprises a second scaler that scales the video image to a size corresponding to a second segment of the continuous presence layout in response to a request from the media relay multipoint controller.

41. The system of claim 35, wherein the network interface also receives relay compressed audio data chunks from the plurality of endpoints, and wherein the control unit further comprises:

a compressed audio processor that:

selects a second group of two or more endpoints to be heard by the first endpoint, parses the received relay compressed audio data chunks, organizes the parsed relay compressed audio data chunks received from the second group of endpoints into a second group of two or more streams of relayed compressed audio data chunks, and transfers the second group of streams toward the first endpoint via the network interface.

42. The system of claim 41, wherein the compressed audio processor determines an audio energy associated with the received relay compressed audio data chunks from each of the plurality of endpoints.

43. The system of claim 42, wherein the signaling and control module selects the two or more selected endpoints based at least in part on the audio energy.

44. The system of claim 42, wherein the signaling and control module determines a speaking endpoint based on the audio energy.

* * * * *